US006445082B1

(12) United States Patent
Klauzenberg et al.

(10) Patent No.: US 6,445,082 B1
(45) Date of Patent: Sep. 3, 2002

(54) VEHICLE WINDOW SWITCH ORIENTATION

(75) Inventors: David E. Klauzenberg, Waterford; Ronald W. Siebenschuh, Romeo, both of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/428,962

(22) Filed: Nov. 4, 1999

(51) Int. Cl.[7] .................................................. B60L 1/00
(52) U.S. Cl. ........................................ 307/10.1; 307/9.1
(58) Field of Search .................................. 307/9.1, 10.1

(56) References Cited

U.S. PATENT DOCUMENTS

| | | | | | |
|---|---|---|---|---|---|
| 4,701,629 A | * | 10/1987 | Citroen | ...................... | 307/10.1 |
| 4,931,714 A | * | 6/1990 | Yamamoto | .................. | 318/663 |
| 5,224,751 A | * | 7/1993 | Hirashima et al. | ............ | 296/70 |
| 5,291,103 A | * | 3/1994 | Ahmed et al. | ................. | 318/3 |
| 5,331,260 A | * | 7/1994 | Ahmed | ....................... | 318/282 |
| 5,434,757 A | * | 7/1995 | Kashiwagi | ................... | 362/80 |

FOREIGN PATENT DOCUMENTS

| | | | | | |
|---|---|---|---|---|---|
| DE | 4118042 | * | 3/1992 | ............ | H01H/9/16 |
| JP | 9-109801 | * | 4/1997 | .............. | B60J/1/00 |
| JP | 2000-272442 | * | 10/2000 | .............. | B60J/5/00 |

* cited by examiner

Primary Examiner—Fritz Fleming
(74) Attorney, Agent, or Firm—Ralph E. Smith

(57) ABSTRACT

A window switch orientation for a motor vehicle is provided. The vehicle includes a first switch assembly that is disposed within the instrument panel of the vehicle along the longitudinal centerline of the vehicle. The first switch assembly is adapted to control the translation of the front left and front right windows. The vehicle also includes a second switch assembly that is disposed within the center console of the vehicle along the longitudinal centerline thereof. The second switch assembly is adapted to control the translation of the rear left and rear right windows. This allows the driver and front passenger to activate all of the windows of the vehicle with ease while reducing costs associated with window switch orientations of the prior art.

13 Claims, 3 Drawing Sheets

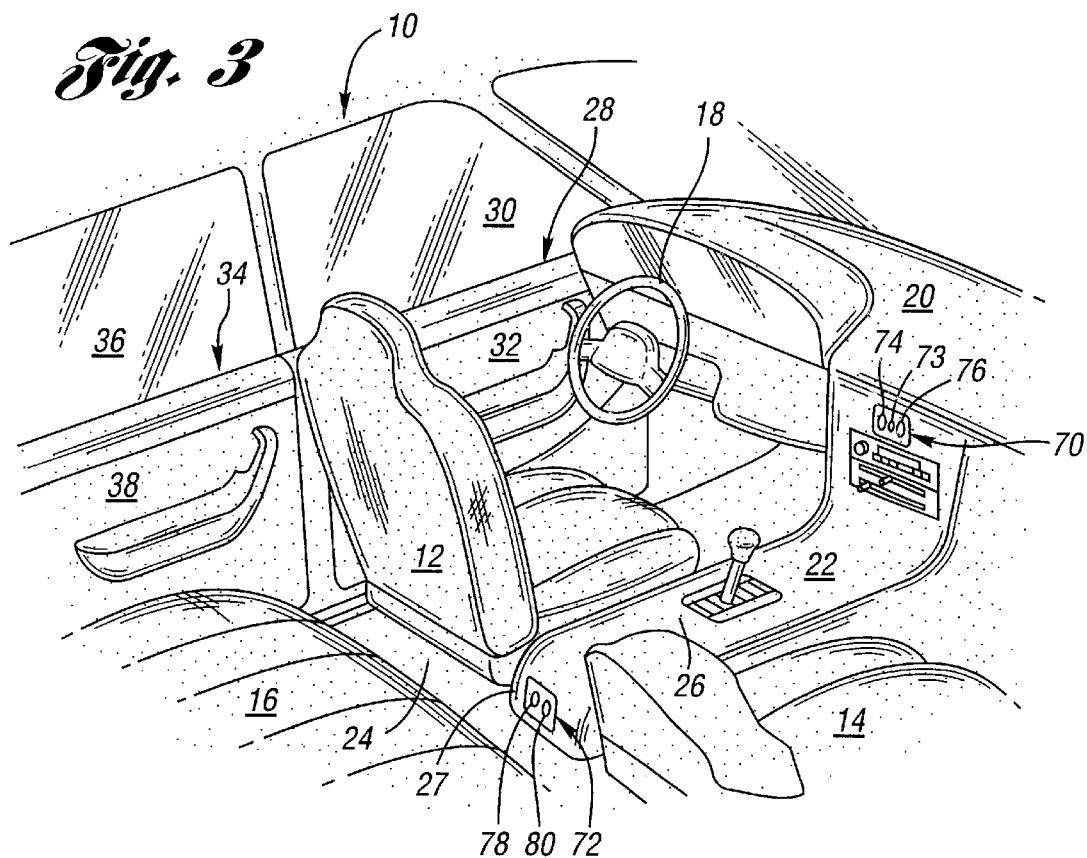
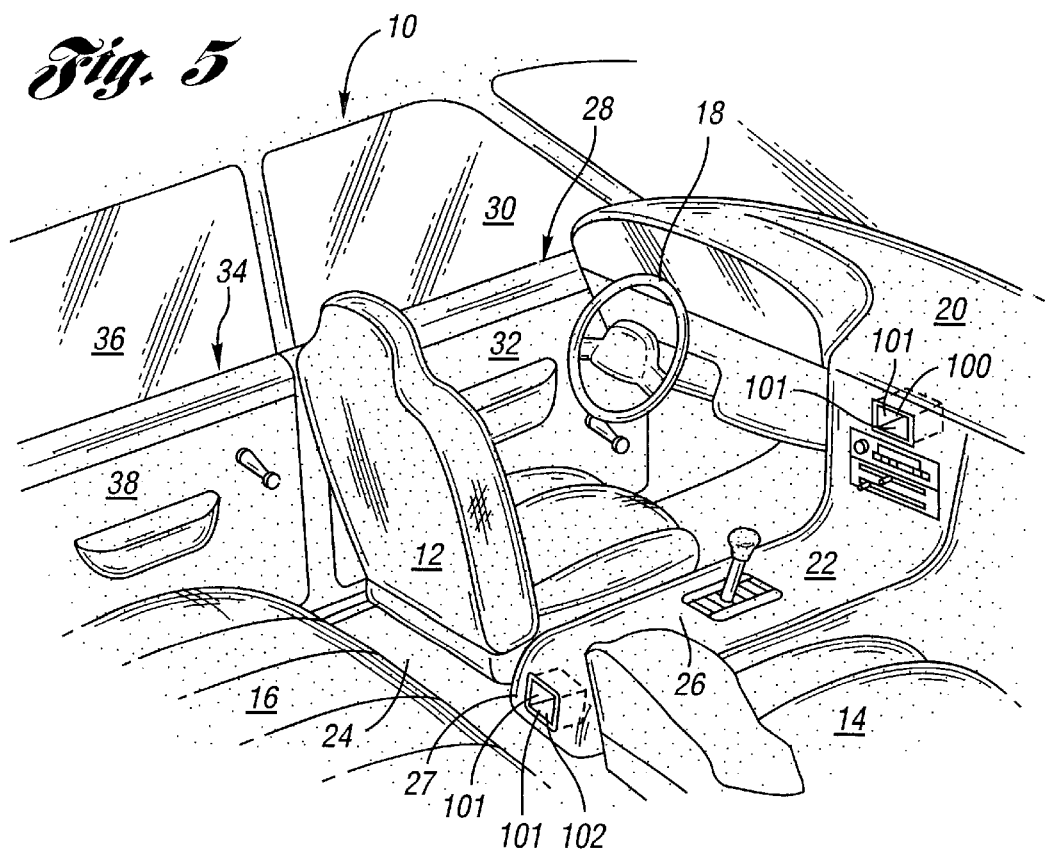

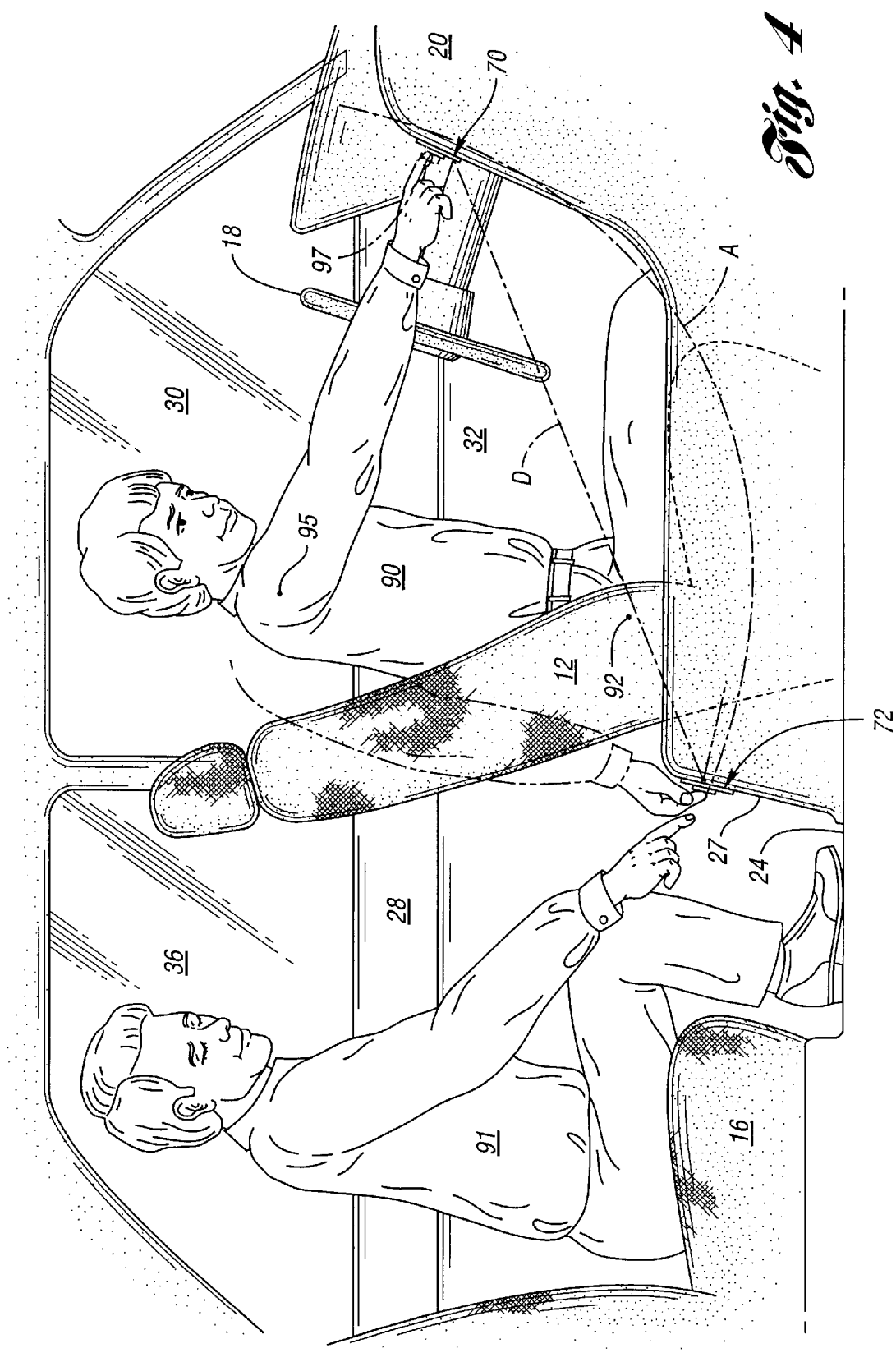

VEHICLE WINDOW SWITCH ORIENTATION

BACKGROUND OF THE INVENTION

1. Technical Field

The present invention relates in general to motor vehicles. More specifically, the present invention relates to switches that control the function of windows in a motor vehicle. More particularly, but without restriction to the particular embodiment and/or use which is shown and described for purposes of illustration, the present invention relates to the placement and orientation of window switches within a motor vehicle.

2. Discussion

Motor vehicles of years past, as well as today, all include some type of window regulator by which a driver or passenger can control the function or the height of the window. Typical windows can be raised or lowered when the regulator is activated. One typical regulator includes a handle rotatably attached thereto. As the handle is rotated or cranked, the window regulator would cause the window to move up or down accordingly. This type of regulator activation was and still is so prevalent in the industry that phrases like "roll up your window" and "roll down your window" have become common terminology in American society. Each window typically has an associated handle by which to raise or lower the window. The handle generally extends from the door in which the window is located and into the passenger compartment. In a typical sedan, each window: front left, front right, rear left, and rear right includes a window crank extending from the front left, front right, rear left, rear right door respectively. The window crank can be used to raise and lower the associated window only. This type of window system has been commonly referred to as manual windows because of the manual activation or cranking of the handle that is required to raise or lower or more generally translate the window.

The manual window, although still used today, has some significant disadvantages. First, the cranking motion is difficult and sometimes excessively burdensome. Second, the speed of the translation of the window is dependent upon the cranking of the handle, which may be, at times, slower than desired. Third, and probably the most prevalent disadvantage of manual windows, is that only the occupant seated adjacent to the door could comfortably operate the window associated with that door. Therefore, it is very difficult to translate more than one window from a specific vehicle position, i.e. diver's seat, passenger's seat, etc. For example, it is very difficult to 'roll down' the front right window from the driver's seat because of the distance from the driver's seat to the crank rotatably coupled to the right front door. The driver can, typically, only translate the front left window with ease, the front passenger can only translate the front right window with ease, and so on. An occupant would have to stretch to try to reach the crank of the door containing the desired window in order to translate the window if it was not immediately adjacent to him or her. Even with all of these disadvantages, manual windows continue to be used in the industry because they are an economically attractive method to translate a vehicle window.

Many years ago, automotive companies began to produce vehicles with power windows. Power windows use electrical current to power small electric motors that can effectively translate the windows. Therefore, power windows could be operated by the simple touch of a switch or button. In addition to the ease of operation, the use of power windows allows for additional switches placed near an occupant, typically the driver, so that the occupant can operate all of the windows of the vehicle with ease. Unfortunately, power windows, especially extra switches are expensive. Although switches located near the driver cure a deficiency of manual windows, the additional switches add a great deal of cost to the system.

Because of the cost differences between power and manual windows, it is desirable to provide a vehicle that can have either power or manual windows depending on the purchasers request. Unfortunately, automotive manufacturers are faced with significant problems when introducing a car line with models having manual windows and models having power windows. One problem is the attachment of the crank to the door in only select models. This is typically performed in one of three ways: (1) providing different trim panels for manual and power window models, (2) providing an attaching hole in the door trim panel so that the crank can attach to the regulator in a manual windows model and the attaching hole can be filed with a snap in plug in the power window models, or (3) allowing the door trim to be pierced to allow access to the regulator only in the manual window models. Another problem to solve deals with the need for switches in the power window models. Again, typically either multiple trim components, plugs, or a piercing process is used for the switch areas.

There has always been a continual and paramount need in the automotive industry to reduce cost and increase quality in motor vehicle. As a result of this need, automotive companies strive to reduce component complexity in the assembly plants, which will typically effect both cost and quality. It is also critically important that advances in cost and quality do not compromise the functionality of the vehicle. More specifically, there is a need to reduce cost while maintaining or improving the functionality of the vehicle. There is also a need to provide the maximum functionality of the car line irrespective of the specific model. There is a further need to produce vehicles for left hand and right hand drive markets using as many common components as are feasible. There is yet another need for the front passenger of the vehicle to be able to control all of the windows of the vehicle without adding excess cost to the vehicle.

Additional benefits and advantages of the present invention will become apparent to those skilled in the art to which this invention relates from a reading of the subsequent description of the preferred embodiment and the appended claims, taken in conjunction with the accompanying drawings.

SUMMARY OF THE INVENTION

It is a principal objective of the present invention to provide a vehicle at a reduced cost without compromising the functionality of the vehicle.

It is another objective of the present invention to provide a window switch orientation that provides at least comparable functionality to a prior art orientation at a reduced cost.

It is yet another objective of the present invention to provide a window switch orientation to provide increased commonality of components, including components for left hand and right hand drive vehicles.

It is a further objective of the present invention to provide a vehicle line that provides increased utility for the vehicles not equipped with power windows.

It is a more particular objective of the present invention to provide a window switch orientation that allows both the driver and front passenger to control the translation of all of the windows of the vehicle easily and allows the rear occupants to control the translation of the rear windows of the vehicle, without adding unnecessary cost to the vehicle.

In one form, the present invention provides a truly unique and functional window switch orientation for a motor vehicle. The window switch orientation of the present invention includes a front switch assembly for controlling the translation of the front right window that is disposed near the longitudinal centerline of the vehicle. The first switch assembly includes a switch for controlling the translation of the front left window and a switch for controlling the translation of the front right window. The present invention also includes a second switch assembly for controlling the translation of the rear right window and the rear left window and is also disposed near the longitudinal centerline of the vehicle. The second switch assembly is disposed rearward of the first switch assembly. The switches contained within the first switch assembly are substantially identical and have a defined size. The second switch assembly includes a switch for controlling the translation of the rear left window and a switch for controlling the translation of the rear right window. Again, The switches contained within the second switch assembly are substantially identical and have a defined size.

The orientation of the switch assemblies is critical to the present invention. The second switch assembly can be located rearward of the first switch assembly by a distance at least two times the size of a switch. The second switch assembly can further be located such that it is rearward of the seating reference point of the operator while the first switch assembly is forward of the seating reference point of the operator. The first and second switch assemblies can also be oriented such that both assemblies are located within the arc of motion of an average operator's arm with the second switch assembly also being located within arm's reach of a rear seat occupant. The second switch assembly is disposed within the center console of the vehicle that extends rearward from the instrument panel of the vehicle. The center console includes a relatively flat surface that terminates in a downstanding wall that interconnects the relatively flat surface and the vehicle floor. In the present invention, the second switch assembly is disposed on the downstanding wall of the center console, which is accessible for a rear seat occupant.

The orientation of the switch assemblies are such that the first switch assembly is disposed along the longitudinal centerline of the vehicle and the second switch assembly is spaced rearwardly from the first switch assembly such that a vehicle driver can locate the second switch assembly by tactile sense and not by visual contact while seated properly in the driver's seat. A traditional orientation would provide switch assemblies that can control all four windows in at least the peripheral vision of the driver while the driver is operating the vehicle, the present invention provides a first switch assembly that is in at least the peripheral vision of the driver and a second switch assembly that can be located by the tactile sense of the driver and not necessarily visual contact. In the present invention the driver is capable of locating and activating the second switch assembly with the tactile sense of his or her right hand. Due to the orientation, the second switch assembly is readily accessible by a rear seat occupant. The second switch assembly can be located by tactile sense or visual contact by the rear seat occupant.

The present invention also provides advantages with respect to an entire vehicle line. A vehicle line typically offers numerous models of essentially the same vehicle. For example, often a vehicle can be ordered as a model with manual windows or as a model with power windows. The present invention provides a first model including power windows that has a first switch assembly occupying a first defined space and a second model including manual windows that has a first storage bin occupying the first defined space. The first model also includes a second switch assembly disposed rearward of the first switch assembly near the longitudinal centerline of the vehicle, which occupies a second defined space. The second model also includes a second storage bin that occupies the second defined space which is used for the second switch assembly for the first model. In order to reduce cost and complexity, the first and second defined spaces, as well as the first and second storage bins, are substantially equal in size and shape.

BRIEF DESCRIPTION OF THE DRAWINGS

The drawings, which form an integral part of the specification, are to be read in conjunction therewith, and like reference numerals are employed to designate identical components in various views:

FIG. 3 is a perspective view of a vehicle cabin in a model with power windows including the window switches of the present invention;

FIG. 4 is a side view of the left-hand side of a vehicle cabin in a model with power windows including the window switches of the present invention; and FIG. 5 is a perspective view of a vehicle cabin in a model without power windows having storage bins in the place of the window switch assemblies.

DETAILED DESCRIPTION OF THE PREFERRED EMBODIMENT

Figure 1:
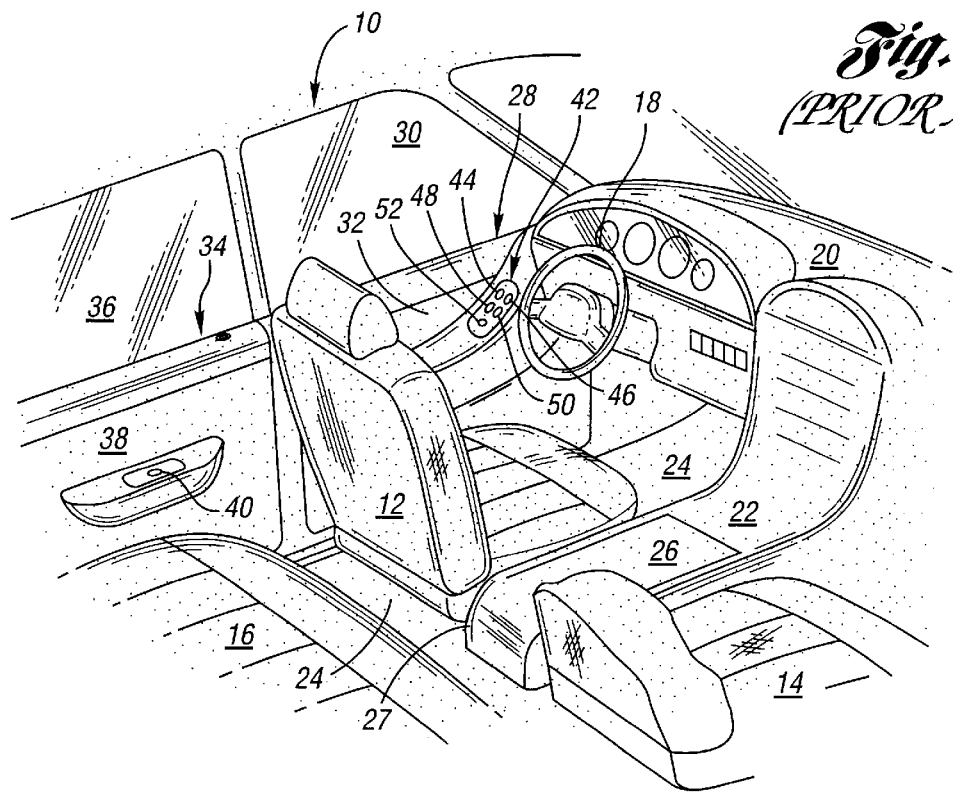
FIG. 1 is a prior art perspective view of a vehicle cabin.

Referring now to the drawings, FIG. 1 illustrates a prior art orientation of vehicle power window switches in a vehicle cabin 10. The general orientation in FIG. 1 is used in many vehicles such as the 1999 Chrysler 300M. Vehicle cabin 10 houses a driver seat 12, a passenger seat 14, and rear seats 16. Driver seat 12 is disposed directly behind steering wheel 18 and laterally from passenger seat 14. Both the driver seat 12 and the passenger seat 14 are preferably slidingly engaged to the vehicle floor 24. Steering wheel 18 is adjacent to the instrument panel 20 of the vehicle cabin 10. A center console 22 extends from the center of the instrument panel 20 towards the rear of the vehicle cabin 10. The center console 22 extends along the centerline of the vehicle cabin 10 between the driver seat 12 and the passenger seat 14. The center console 22 is preferably attached to the vehicle floor 24 and has an upper surface 26 at a height comparable to the cushion height of the driver seat 12 and the passenger seat 14. Upper surface 26 extends from the instrument panel 20 rearward and terminates at a downstanding wall 27. Downstanding wall 27 interconnects upper surface 26 and vehicle floor 24. Also illustrated in FIG. 1 is a driver door 28 having a left front window 30 and a door trim panel 32. FIG. 1 also illustrates a left rear door 34 having a left rear window 36 and a rear door trim panel 38. The window toggle switch orientation shown in FIG. 1 is extremely prevalent in the automotive industry. The left rear door trim panel 38 includes a switch 40 that can translate the left rear window, i.e. raise or lower the window. Switch 40 typically consists of some type of toggle that can be pivoted in one direction to cause the window to raise and pivoted in another direction to cause the window to lower. It should be appreciated that a number of various switches can be used in this type of application. Although not shown, typically the right rear door and right front door in such an orientation include a switch similar to the switch 40. The driver door 28 includes a larger switch assembly 42 that contains four switches 44, 46, 48, 50 that can be used to control the left front window 30, the right front window (not shown), the left rear window 36, and the right rear window (not shown). The switch assembly 42 may also include a lock out button 52 that deactivates the switches located on the front right door, right rear door, and the left rear door. This type of orientation is very popular because it allows the driver to have control over the translation of all of the windows of a vehicle. Although switch assembly 42 adds tremendous functionality to the vehicle, it also adds significant cost to the system, which is undesirable.

Figure 2:
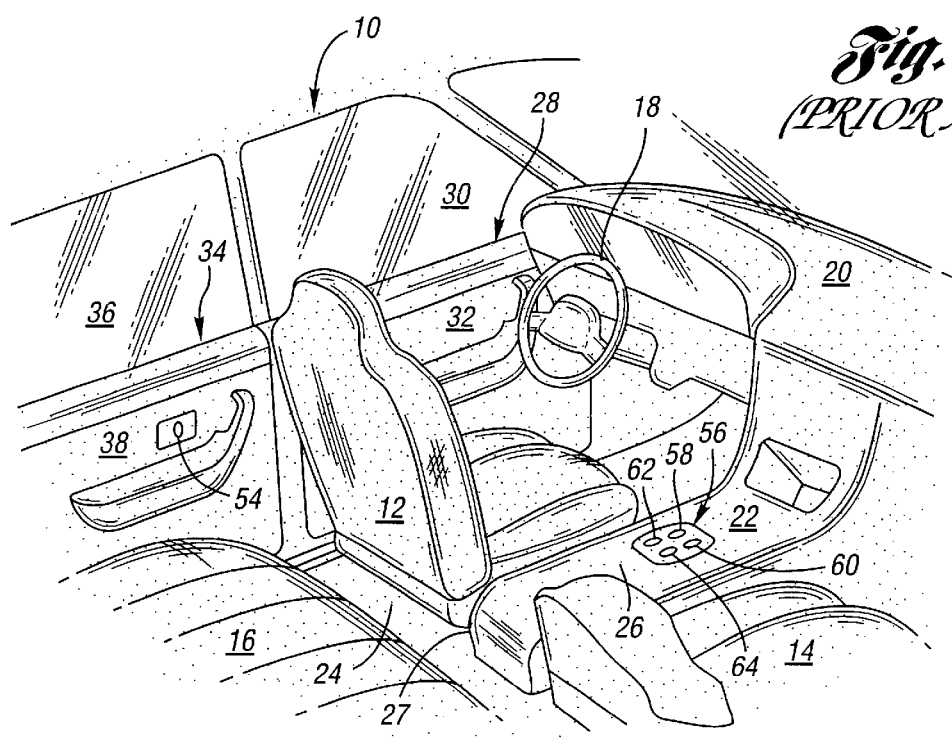
FIG. 2 is another prior art perspective view of a vehicle cabin.

FIG. 2 illustrates another example of a prior art orientation of vehicle power window switches in a vehicle cabin 10. The general orientation in FIG. 2 is used in a number of vehicles such as the 1999 Saturn Sedan. The general vehicle cabin 10 layout is similar to that of FIG. 1, but the window switch orientation is substantially different. The left rear door 34 includes a switch 54 for translating left rear window 36, and the right rear door has a similar switch for controlling the translation of the right rear window. The orientation in FIG. 2 includes a switch assembly 56 that is disposed on the upper surface 26 of the center console 22. Switch assembly 56 is disposed along the longitudinal centerline of both the center console 22 and the vehicle cabin 10. Switch assembly 56 includes four switches 58, 60, 62, and 64 that are utilized to control the translation of the left front window 30, right front window (not shown), left rear window 36, and right rear window (not shown), respectively. It should be appreciated that switch assembly 56 could also include a lock-out button to prevent translation of the rear windows from the switch. 54 located on the left rear door and the switch located on the right rear door (not shown). This orientation provides some advantages over the orientation in FIG. 1. The orientation in FIG. 2, essentially changes the location of the driver's switch assembly 56 from the door, as in FIG. 1, to the center console, as in FIG. 2. This allows the switch that was associated with the right front door to be removed because a front seat passenger could now reach the switch assembly 56 disposed in the center console 22. Furthermore, this orientation provides the front passenger the ability to control the translation of all of the windows from the seated position, which was not possible in the orientation in FIG. 1.

Although the prior art orientations in FIGS. 1 and 2 have provided sufficient functionality to owners and operators of vehicles in the past, it is increasingly important to decrease cost of a vehicle while providing at least comparable functionality. FIG. 3 illustrates a vehicle cabin 10 having the window toggle switch orientation of the present invention. The present invention includes two switch assemblies, a front switch module 70 and a rear switch module 72. The front switch module 70 is disposed in the instrument panel 20 along the longitudinal centerline of the vehicle cabin 10. The front switch module 70 includes two switches 74 and 76 that control the translation of the left front window 30 and the right front window (not shown), respectively. The front switch module 70 also preferably includes a lockout butto[008e] 73 that can be used to deactivate the switches of the rear switch module 72. The rear switch module 72 is disposed on the rear downstanding wall 27 of the center console 22, also along the longitudinal centerline of the vehicle cabin 10. The rear switch module 72 includes two switches 78 and 80 that control the translation of the left rear window 36 and the right rear window (not shown), respectively. It should be appreciated that the front and rear switch assemblies 70 and 72 are both within an 'arm's reach' of both the driver and front passenger, while only the rear switch assembly 72 is within 'arm's reach' of the rear occupants. This is effectively illustrated in FIG. 4. The placement of the switch assemblies 70 and 72 are located depending on the arc of motion of an average driver's arm 'A', which is defined as an curve equidistant from shoulder 95. The arc of motion helps to define the proper location of the window switch assemblies 70 and 72. In the preferred embodiment, the switch assemblies are located within the arc of motion such that the switches are easily activated by the driver, and consequently, the front passenger of the vehicle. It should be appreciated that the arc of motion is intended to be a guide for locating the window switch assemblies 70 and 72, both switches assemblies 70 and 72 should be within the arc of motion 'A' while the rear switch 72 is comfortably accessible to a rear seat occupant 91. In the preferred embodiment, the distance 'D' between the front and rear switch assemblies 70 and 72 is approximately 3 feet, however, it should be appreciated that any separation of the switches that control the front windows and switches that control the rear windows are within the scope of the present invention. Each switch 74, 76, 78 and 80 has a defined size 97, and it should be appreciated that the distance 'D' between the switch assemblies 70 and 72 is significantly greater than size 97. In fact a distance 'D' of greater than 2 times size 97 would be sufficient to define the present invention over the prior art, as disclosed in FIGS. 1 and 2.

The orientation or the window switches of the present invention can be more fully explained with continued reference to FIG. 4. The driver 90 of the vehicle sits in the drivers seat 12 that is, preferably, slidingly engaged to vehicle floor 24. Driver 90 has a seating reference point 92, commonly referred to as the H-point in the industry because of its relation to the hip of the occupant. The driver's H-point 92 will move if the driver's seat 12 is longitudinally moved along the floor 24. In general, switch assembly 70 will be disposed closer to the instrument panel 20 than H-point 92. Switch assembly 72 will generally be disposed equal to or behind the H-point 92 of the driver 90. Both switch assemblies 70 and 72 are disposed in close proximity to the driver 90 to allow easy access to both switch assemblies 70 and 72.

The positioning of the window switches can lead to significant advantages in functionality, commonality, and cost. The present invention allows greater functionality to all models of a vehicle line. The models having power windows, as described in FIGS. 3 and 4, allow the driver and front passenger to control the function of all windows of the vehicle. While models with power windows have the appropriate switch assemblies, models without power windows typically waste the space that was used to house the switch or switch assembly. The present invention, as illustrated in FIG. 5, provides plastic storage bins 100 and 102 for insertion into the space occupied by the switch assemblies in the models having power windows. Storage bins 100 and 102 can be used by the owner or operator of a model with manual windows to store coins and other articles. This provides the operator of a model with manual windows greater functionality than the prior art, which typically wastes the space used for the switch assemblies in a model with power windows in the same vehicle line. It should be appreciated that storage bins 100 and 102 includes a plurality of surfaces 101 that extend inward from the surface of the center console 22 or the instrument panel 20 and terminate in a common back wall. The present invention also provides commonality of a greater number of parts. The switch assemblies 70 and 72 used in the present invention are substantially identical, therefore the storage bins 100 and 102 are also substantially identical. The storage bins 100 and 102 differ only in location and the switch assemblies only differ in electrical attachment and possibly a lock-out button. Furthermore, the fact that the switch assemblies are disposed along the longitudinal centerline of the vehicle, allows the switch assemblies to be identical irrespective of whether the vehicle is a left hand or a right hand drive vehicle. In addition to the advantages described above, the present invention also reduces cost while providing increased functionality to the vehicle customer. The reduced cost comes from the elimination of the large driver switch assembly, 42 in FIG. 1 and 56 in FIG. 2, as well as reducing the number of rear switch assemblies and passenger side switch assemblies. The window switch orientation of the present invention allows the driver as well as the front passenger to control the translation of all of the vehicle windows comfortably from a seated position, as shown in FIG. 4. The present invention reduces cost by only requiring 2 switch assemblies, each assemblies having only 2 switches that control all 4 windows of a typical 4-door car, truck, or sport-utility vehicle.

While the above description constitutes the preferred embodiment of the invention, it will be appreciated that the invention is susceptible to modification, variation, and change without departing from the proper scope or fair meaning of the accompanying claims.

What is claimed is:

1. A window switch orientation for a motor vehicle having a centerline and a passenger compartment floor, the orientation comprising:
    a first switch assembly disposed substantially along the centerline and within visible contact of a properly seated vehicle operator; and
    a second switch assembly disposed substantially along the centerline and on a surface extending transversely to the passenger compartment floor and out of visual contact of a properly seated vehicle operator.

2. A window switch orientation for a motor vehicle comprising:
    a first switch for controlling the translation of the left front window disposed near the longitudinal centerline of the vehicle, said first switch having a defined size;
    a second switch for controlling the translation of the right front window disposed near the longitudinal centerline of the vehicle and in close proximity to said first switch, said second switch having a defined size;
    a third switch for controlling the translation of the left rear window disposed near the longitudinal centerline of the vehicle rearward of said first switch by a distance greater than two times said size of said first switch and outside visual contact of a properly seated vehicle operator; and
    a fourth switch for controlling the translation of the right rear window disposed near the longitudinal centerline of the vehicle and in close proximity to said third switch, said fourth switch is disposed rearward of said second switch by a distance greater than two times said size of said second switch and outside visual contact of a properly seated vehicle operator.

3. A vehicle having a driver's seat capable of accepting a human operator of the vehicle, a passenger seat capable of accepting a human occupant, a left rear seat capable of accepting a human occupant, and a right rear seat capable of accepting a human occupant, said vehicle also having a front left door with an associated window capable of translating therewith, a front right door with an associated window capable of translating therewith, a rear left door with an associated window capable of translating therewith, and a rear right door with an associated window capable of translating therewith, said vehicle also having an instrument panel disposed in forward of said passenger's seat and said driver's seat, said vehicle also having a floor defining the bottom of the vehicle cabin, said human operator of said vehicle having a seating reference point, said vehicle comprising:
    a first switch assembly having sole control for the translation of the front right window and the front left window, said first switch being disposed near the longitudinal centerline of the vehicle; said first switch assembly includes a switch to control the translation of the left front window and a switch to control the translation of the right front window; and
    a second switch assembly having sole control for the translation of the rear right window and the rear left window also disposed near the longitudinal centerline of the vehicle, said second switch assembly disposed rearward of said first switch assembly and rearward of the seating reference point of the operator of the vehicle on a surface extending transversely to the floor of the vehicle cabin, whereas said first switch assembly is disposed forward of the seating reference point of the operator of the vehicle; said second switch assembly includes a switch to control the translation of the left rear window and a switch to control the translation of the right rear window.

4. A window switch orientation for a motor vehicle having a pair of translatable front windows and a pair of translatable rear windows comprising:
    a first switch assembly disposed near the longitudinal centerline of the vehicle, said first switch assembly having at least one switch with a defined size; and
    a second switch assembly disposed near the longitudinal centerline of the vehicle and outside visual contact of a properly seated vehicle operator, said second switch assembly being disposed rearward of said first switch assembly by a distance greater than two times said size of said at least one switch.

5. The window switch orientation as set forth in claim 4, wherein the pair of translatable front windows is solely controlled by said first switch assembly.

6. The window switch orientation as set forth in claim 5, wherein the pair of translatable rear windows are solely controlled by said second switch assembly.

7. A vehicle having a driver's seat, a passenger seat, a rear seat assembly including a left and right seat portion, the vehicle also having a front left door with an associated window capable of translating therewith, a front right door with an associated window capable of translating therewith, a rear left door with an associated window capable of translating therewith, and a rear right door with an associated window capable of translating therewith, the vehicle also having an instrument panel disposed in forward of the passenger seat and the driver's seat, the vehicle also having a floor defining a bottom of a vehicle cabin and a center console disposed along a longitudinal centerline of the vehicle and including a relatively flat surface extending rearward from the instrument panel and terminating at a downstanding wall interconnecting the relatively flat surface and the vehicle floor, the vehicle comprising:

a first switch assembly for controlling the translation of the front right window and the front left window, the first switch being disposed near the longitudinal centerline of the vehicle; and a second switch assembly for controlling the translation of the rear right window and the rear left window also disposed near the longitudinal centerline of the vehicle in connection with the downstanding wall, the second switch assembly being spaced rearwardly from the first switch assembly sufficiently for a vehicle driver to locate said second switch assembly with tactile sense and not visual contact and so that a rear seat passenger can comfortably access the second switch assembly.

8. The invention as set forth in claim 7, wherein said first switch assembly only controls the translation of the front right window and the front left window.

9. The invention as set forth in claim 7, wherein said second switch assembly is in sole control of the translation of the left rear window and the right rear window.

10. A window switch orientation for a motor vehicle having a dashboard and a longitudinal centerline, the orientation comprising:

a first switch assembly disposed substantially along the centerline and closer to the dashboard than to a driver seating reference point such that the first switch assembly is comfortably accessible by a driver, but not comfortably accessible by a rear seat occupant; and a second switch assembly disposed substantially along the centerline and even with or rearward of the driver seating reference point such that the second switch assembly is comfortably accessible both by the driver and the rear seat occupant.

11. The window switch orientation of claim 10 wherein the second switch assembly is outside visual contact of a properly seated driver.

12. The window switch orientation of claim 10 wherein the first switch assembly is adapted to control movement of at least one front window of a motor vehicle.

13. The window switch orientation of claim 10 wherein the second switch assembly is adapted to control movement of at least one rear window of a motor vehicle.

* * * * *